United States Patent [19]

Fink et al.

[11] 4,213,621
[45] Jul. 22, 1980

[54] CENTRIFUGALLY-ACTUATED CHUCK ATTACHMENT

[76] Inventors: Anton Fink; Nicholas A. Fink, both of 149 Crescent Dr., Albertson, N.Y. 11507

[21] Appl. No.: 935,924

[22] Filed: Aug. 23, 1978

[51] Int. Cl.³ ............................................. B23B 31/14
[52] U.S. Cl. ..................................... 279/1 C; 279/110
[58] Field of Search .......................... 279/1 C, 110, 119

[56] References Cited

U.S. PATENT DOCUMENTS

| | | | |
|---|---|---|---|
| 2,207,621 | 7/1940 | Hite | 279/110 |
| 2,593,706 | 4/1952 | Von Zelewsky | 279/1 C X |
| 2,828,134 | 3/1958 | Buck et al. | 279/1 C X |
| 2,982,558 | 5/1961 | Multer | 279/1 C X |
| 3,975,029 | 8/1976 | Benjamin | 279/1 C |

*Primary Examiner*—Z. R. Bilinsky
*Attorney, Agent, or Firm*—Leonard H. King

[57] ABSTRACT

A multi-jaw chuck having a centrifugally-actuated attachment for counterbalancing the adverse effect of centrifugal force on the chuck jaws during high speed operation. The chuck attachment includes an annular, hollow housing coaxially mounted on the chuck body and a lever associated with each of the jaws of the chuck which is pivotally mounted in the housing for pivotable movement about an axis parallel to the chuck body axis. Each of the levers includes a first pivot arm, disposed on one side of the pivot axis, for engagement with the jaw associated therewith and a second pivot arm, disposed on the other side of the pivot axis. The second arm has an effective length and weight such that it moves outwardly from the axis of the chuck body as a result of the centrifugal force developed upon rotation of the chuck body and, in turn, urges the first arm into engagement with the jaw associated therewith. This action counterbalances the centrifugal force acting on the jaws and, therefore, enhances the clamping force thereof. The attachment is readily-adaptable to most conventional chucks without requiring any modification of the chuck or its internal components.

4 Claims, 2 Drawing Figures

CENTRIFUGALLY-ACTUATED CHUCK ATTACHMENT

FIELD OF THE INVENTION

This invention relates to multiple-jaw chucks. More particularly, it relates to a multi-jaw chuck provided with an attachment for counterbalancing the adverse effect of centrifugal force on the chuck jaws during high speed operation.

BACKGROUND OF THE INVENTION

With conventional multi-jaw chucks, which are particularly designed for driving workpieces in lathes or in other similar machine tools, the jaws tend to open at high operating speeds; this is due to the centrifugal forces acting on the jaws during rotation. As a result, the clamping or holding force of the jaws is adversely effected. In fact, at speeds in excess of 3000 R.P.M., the loss of holding force is a tremendous problem. Moreover, presently with the availability of ceramic cutting tools, the trend to spindle speeds in the range of between 3000 and 6000 R.P.M. has become common, thus compounding the problem.

To combat this problem, many larger power chucks have been equipped with counterweighted jaws or internally mounted counterweights coacting with the jaws to offset the adverse effects of centrifugal force. However, (see for example, U.S. Pat. Nos.: 1,056,435; 2,367,863; 2,932,524; 2,474,633; 2,593,706; 2,784,977; 3,975,029; 4,017,203; and 4,009,888) these prior art devices have been found to have certain significant drawbacks. In particular, these devices by and large each require a unique or greatly modified internal chuck construction and, therefore, a special or "one of a kind" chuck. They are also generally quite complicated in construction and expensive to produce. Most importantly, they are not readily adaptable to conventional chucks.

Accordingly, it is an object of the present invention to provide a novel chuck having an attachment for counterbalancing the adverse effects of centrifugal force on the chuck jaws during high speed operation.

It is also an object of the present invention to provide a novel chuck attachment which is single in construction, reliable in operation and economical to fabricate.

It is a more particular object of the present invention to provide a novel chuck attachment having the foregoing attributes and characteristics which may be readily attached to practically any conventional chuck, without requiring any modification of the chuck or its internal components.

SUMMARY OF THE INVENTION

Certain of the foregoing and related objects are readily attained in accordance with the present invention by the provision of a chuck attachment secured to a chuck having a rotatable chuck body and a plurality of jaws supported in the chuck body and radially movable therein relative to the longitudinal axis of the chuck body between a retracted and clamping position. The chuck attachment includes a hollow housing mountable about the chuck body and a plurality of levers, each of which is associated with one of the jaws and is pivotably mounted in the housing for movement about a pivot axis parallel to the longitudinal axis of the chuck. Each of the levers has a first pivot arm disposed on one side of the pivot axis for engagement with the jaw associated therewith, and a second pivot arm, disposed on the other side of the pivot axis. The second arm has an effective length and weight such that it moves outwardly from the axis of the chuck body as a result of the centrifugal force developed upon rotation of the chuck body and, in turn, urges the first arm into engagement with the jaw associated therewith. This action counterbalances the centrifugal force acting on the jaws and, therefore, enhances the clamping force thereof.

Preferably, the housing is annular-shaped, has a generally U-shaped cross-section and defines an annular U-shaped channel, the opening of which faces the chuck body and the jaws thereof. Most advantageously, the levers are each mounted on a pin pivotably supported in the channel of the housing for pivotable movement about an axis parallel to the longitudinal axis of the chuck body.

In a preferred embodiment of the invention, each of the levers has a generally arcuate configuration and the first pivot arms thereof are provided with an internally-threaded bore, the axis of which is disposed normally relative to the longitudinal axis of the chuck body. A set screw is threadably received in each of the bores for engagement with the jaw associated with each of the respective pivot arms. Most desirably, the housing is demountably secured to the chuck body.

DETAILED DESCRIPTION OF THE ILLUSTRATED AND PREFERRED EMBODIMENT

Figure 1:
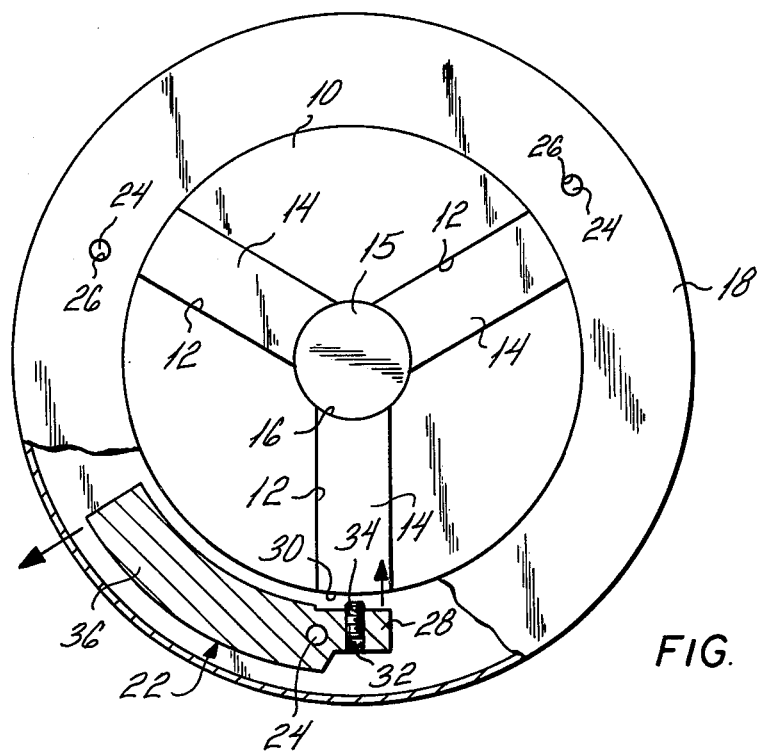
FIG. 1 is a front elevation of a chuck having a chuck attachment embodying the present invention, with a portion broken away to show internal construction.

Referring now, in detail, to the drawing and, in particular FIG. 1 thereof, therein illustrated is a novel chuck attachment embodying the present invention, incorporated in a conventional multi-jaw air chuck having a cylindrical steel body 10 with channels 12 which receive radially sliding master jaw members 14. Jaw members 14 are radially slidable for movement between a retracted position and a clamping position relative to a workpiece 15 disposed at the center of chuck body 10; the inner ends 16 of the jaw members 14 cooperatively grasping and clamping workpiece 15 in the clamping position thereof. The construction and operation of a conventional chuck is more fully described in U.S. Pat. No. 3,727,929 which is hereby incorporated by reference herein.

Figure 2:
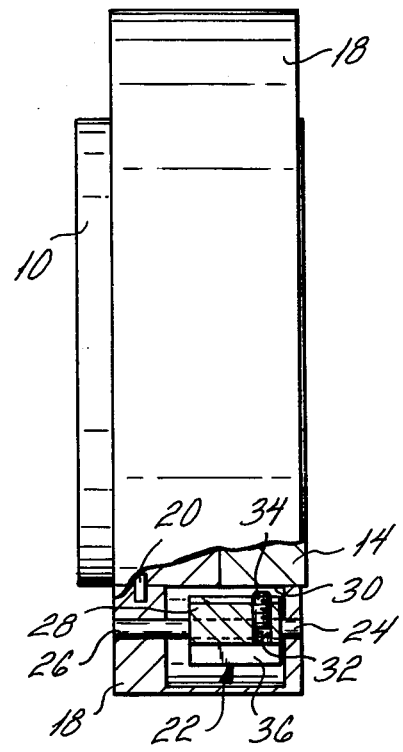
FIG. 2 is a side elevational view thereof partially broken away to show internal construction.

An annular U-shaped housing 18 is demountably secured to the outer circumferential lateral surface of chuck body 10, such as by fastening means 20, as shown in FIG. 2, and is disposed coaxially relative to body 10. A plurality of generally arcuately-shaped levers 22 are pivotably mounted in the channel housing 18 for pivotal movement about an axis parallel to the longitudinal axis of chuck body 10. A lever 22 is provided for each of the jaw members 14; in this instance, three levers 22 (only one of which is shown) is provided for the three jaw members 14.

Levers 22 are each supported on a pivot pin 24 which is pivotably supported in a bore 26 extending through the sidewalls of housing 18, the axis of which is parallel to the longitudinal axis of chuck body 10 and which is in general alignment with one of the sidewalls of channels 12. Levers 22 each include a relatively short first pivot arm 28 which is disposed on one side of pivot pin 24 and which opposes the outer end 30 of one of master jaw members 14. First pivot arms 28 each have an internally threaded bore 32 extending therethrough, the axis of which is disposed normally relative to the axis of chuck body 10. A set screw 34 is threadably received in each of bores 32 for operative engagement with the outer end 30 of the opposing jaw member 14. Levers 22 also each include a relatively long and weighted second pivot arm 36 disposed on the opposite side of pivot pin 24.

In operation, when a workpiece 15 is grasped by jaw members 12 and chuck body 10 is rotated about its longitudinal axis on a lathe or similar piece of machinery, the weighted and longer second pivot arm 36 of each of levers 22 will pivot outwardly as a result of the centrifugal force developed by the rotational motion. This, in turn, will cause the respective first pivot arms 28 to pivot inwardly as a result of which the set screws 34 will engage the outer ends 30 of jaw members 14 and counteract and offset the centrifugal force exerted on the jaw members. This action enhances the clamping or holding force of the jaw members which have a tendency to open during high speed operation.

As can be appreciated, the actual force exerted by the levers 22 on the jaws 14 is a component of the weight of the second pivot arms and the mechanical advantage which is obtained through the relationship between the pivot point of the pin 24 and the pressure point of the set screw 34. This ratio can, of course, be altered to change the force of a given weighted pivot arm. The size and weight of the second pivot arms 36 are only restricted to the space available within a given outside diameter of housing 18. In certain cases, the outside diameter of the housing may be restricted. However, for most applications, the outer diameter can be as large as desired and the size of the weighted pivot arms is therefore unrestricted.

As can be seen from the foregoing, the chuck attachment has an extremely simple construction which permits it to be attached to practically any existing chuck, while requiring no appreciable modification of the chuck or its internal components.

While there has been shown and described and pointed out the fundamental novel features of the invention as applied to a preferred embodiment thereof, it will be understood that various omissions, substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A centrifugally-actuated chuck attachment for a chuck having a rotatable chuck body and a plurality of jaws supported in said chuck body and radially movable therein relative to the longitudinal axis of the chuck body between a retracted and clamping position, comprising:

a hollow annular shaped housing mountable about the chuck body, defining an annular U-shaped channel, the opening of which faces the chuck body and the jaws thereof; and a lever associated with each of the jaws pivotably mounted on a pin in said channel in said housing for pivotal movement about a pivot axis parallel to the longitudinal axis of the chuck body, said lever having a first and second pivot arm disposed on opposing sides of said pivot axis thereof, said first arm being disposed for operative engagement with its associated jaw and said second arm having an effective length and weight such that it moves outwardly from the longitudinal axis of the chuck body as a result of the centrifugal force developed upon rotational movement of the chuck body and, in turn, urges said first arm into engagement with said jaw associated therewith to thereby counterbalance the centrifugal force acting on said jaw and enhance the clamping force thereof; wherein said lever has a generally arcuate configuration, wherein said first pivot arm has an internally-threaded bore formed therethrough having an axis which is disposed normally relative to the longitudinal axis of the chuck body and wherein an externally-threaded set screw is threadably received in said bore for engagement with said jaw associated with said lever.

2. The chuck attachment according to claim 1, wherein said housing is demountably secured to said chuck body.

3. A chuck comprising:
a rotatable chuck body;
a plurality of jaws supported in said chuck body and radially movable therein relative to the longitudinal axis thereof between a retracted and clamping position;
a hollow annularly shaped housing mounting about the chuck body, defining an annular U-shaped channel, the opening of which faces the chuck body and the jaws thereof; and
a plurality of levers, each of which is associated with one of said jaws and is pivotably mounted on a pin in said channel in said housing for pivotal movement about a pivot axis parallel to said axis of said body, each of said levers having a first and second pivot arm disposed on opposite sides of said pivot axis thereof with said first arm being disposed for operative engagement with its associated jaw and said second arm having an effective length and weight such that it moves outwardly from the longitudinal axis of the chuck body as a result of the centrifugal force developed upon rotational movement of the chuck body and, in turn, urges said first arm into engagement with said jaw associated therewith to thereby counterbalance the centrifugal force acting on said jaw and enhance the clamping force thereof, wherein each of said levers has a generally arcuate configuration, wherein said first pivot arms thereof each has an internally-threaded bore formed therethrough having an axis which is disposed normally relative to said axis of said chuck body and wherein a set screw is threadably received in each of said bores for engagement with said jaw associated with said pivot arm.

4. The chuck according to claim 3, wherein said housing is demountably secured to said chuck body.

* * * * *